May 5, 1959   P. R. PITTMAN, JR   2,885,625
ELECTRICAL MEASUREMENT AND CONTROL DEVICE
Filed Oct. 31, 1955   2 Sheets-Sheet 1

INVENTOR.
Paul R. Pittman Jr.
BY Dybvig and Jacox
HIS ATTORNEYS

United States Patent Office 2,885,625
Patented May 5, 1959

2,885,625

ELECTRICAL MEASUREMENT AND CONTROL DEVICE

Paul R. Pittman, Jr., Dayton, Ohio, assignor to Globe Industries, Inc., a corporation of Ohio Application October 31, 1955, Serial No. 543,690

3 Claims. (Cl. 322—32)

This invention relates to an electrical measurement and control device and more particularly to a device having a rotatably mounted electric motor.

The conventional electric motor has two magnetically interacting members, one of which is a stationary member called the stator and the other of which is a rotatable member called the rotor. In the present invention, an electric motor is designed and mounted in such a manner that both of the magnetically interacting members, the rotor and the stator, are rotatable. In order to avoid confusion of terms in this specification, the magnetically interacting members of this rotatably mounted electric motor will be called the first rotor and the second rotor, there being no stator.

One object of this invention is to provide a rotatably mounted motor having two magnetically interacting members which are both rotatable about their common axis.

Another object of this invention is to provide a rotatably mounted motor having the properties of an electro-mechanical differential, the differential device having an electrical input, a mechanical input and a mechanical output.

Still another object of this invention is to provide a rotatably mounted electric motor which can be used in cooperation with a stationary electric motor to form an electrical differential, the electrical differential having two electrical inputs and one mechanical output.

A further object of this invention is to provide an electrical measurement and control device embodying a rotatably mounted electric motor, the device being a useful component in servo control circuits for controlling, among other things, mechanical speed, electrical frequency, or electrical voltage.

Other objects and advantages reside in the construction of parts, the combination thereof and the mode of operation, as will become more apparent from the following description.

In the drawings, Figure 1 is a side elevational view of a rotatably mounted electric motor, with parts broken away.

Figure 1:
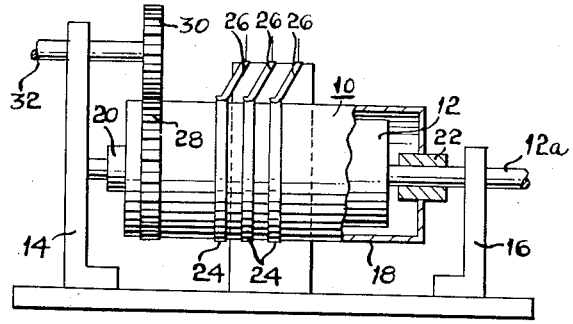

Referring to the drawings in detail, the rotatably mounted motor 10 in Figure 1 comprises a first rotor 12 having a shaft 12a supported at both ends by stationary support bearings 14 and 16. A second rotor 18 having bearings 20 and 22 is adapted to rotate about the first rotor 12. Electrical energy is supplied to the motor 10 through slip ring contacts 24 engaging brushes 26, the brushes 26 conducting electrical energy from an external source.

When the motor 10 is a conventional electric motor, as for example, a synchronous motor, the rotor 12 is commonly referred to as the armature of the motor 10 and the rotor 18 is commonly refered to as the housing for the motor 10.

When the motor 10 is energized, the rotors will rotate one with respect to the other at a characteristic speed as determined by the operating characteristics of the motor and the electrical input characteristics.

The motor 10 is also adapted to be rotated mechanically in the following manner. A ring gear 28 encircling the second rotor 18 meshes with a gear 30 attached to a shaft 32. When the shaft 32 is rotated by an external mechanical force, the second rotor 18 will be rotated at an impressed speed as determined by the characteristics of the external mechanical force.

When the motor 10 is energized electrically and the second rotor 18 is driven mechanically, the first rotor 12 will rotate at a speed which is the sum or difference of the characteristic speed of the motor 10 and the impressed speed of the second rotor 18. When the impressed speed equals and opposes the characteristic speed, it follows that the first rotor 12 will not rotate.

Thus, the motor 10 has the properties of a mechanical differential in which the characteristic motor speed and the impressed mechanical speed are either added or subtracted to determine the speed of the first rotor 12. Since the brushes 26 represent an electrical input and the shaft 32 represents a mechanical input, the device of Figure 1 is termed an electromechanical differential. An electromechanical differential can be obtained by combining an electric motor with an ordinary mechanical differential. In this invention, however, the electromechanical differential is obtained with an electric motor in the absence of any mechanical differential.

It is to be noted that the differential characteristics of the device of Figure 1 are unchanged if the mechanical input is directed to the shaft 12a of the first rotor 12 and the mechanical output is taken from the shaft 32. That is, the mechanical input and output are interchangeable.

Figure 2:
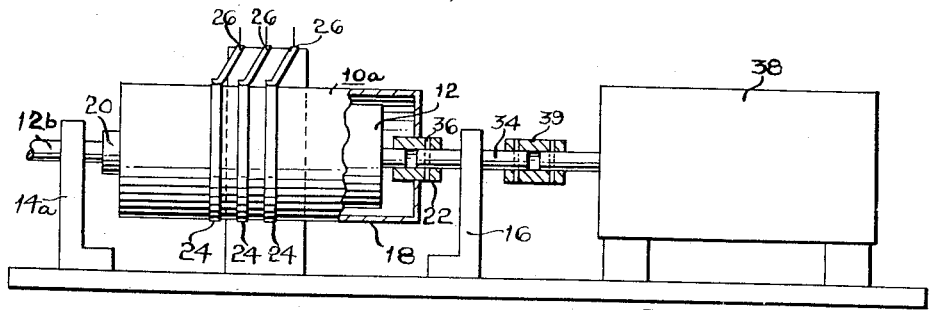
Figure 2 is a side elevational view of a rotatably mounted motor connected to a prime mover, with parts broken away.

In Figure 2, a modification of the electromechanical differential is shown, in which the gears 28 and 30 and the shaft 32 are eliminated. As before, the motor 10a comprises a first rotor 12 having a shaft 12b and a second rotor 18 and is energized through slip ring contacts 24 cooperating with brushes 26. The shaft 12b of the first rotor 12 is journalled at one end to a support bearing 14a and at the other end to the bearing 22 which is attached to the second rotor 18. A shaft 34 is also journalled in the bearing 22; but is non-rotatably secured thereto by a pin 36. The shaft 34 is supported by the stationary support bearing 16.

For purposes of illustration, a prime mover 38 is coupled to the shaft 34 through a coupling member 39. The prime mover 38 may be, among other things, a generator or a gas engine, or another electric motor. When the prime mover 38 is operating, the second rotor 18 of the motor 10 will be driven at an impressed speed equal to that of the prime mover. If the motor 10a is also energized through the slip ring contact 24, the first rotor 12 will rotate with a speed which is equal to the sum or difference of the impressed mechanical speed and the characteristic electrical speed.

As an alternative, the prime mover 38 could have been coupled to the first rotor shaft 12b at the other end of the motor 10a. In this case, the second rotor 18 would drive the shaft 34 at the differential speed. It is apparent, thus, that the mechanical input and mechanical output of the electromechanical differential of Figure 2 are interchangeable. Also, the electromechanical differential may be considered to have one electrical input and two mechanical outputs, the characteristic speed of the motor 10 being divided between the two output shafts.

The electromechanical differential, as described herein, has particular utility in control circuits as an error detection device. In such applications, the electrical input energizes the motor 10 to operate at a characteristic speed and the mechanical input drives one rotor of the motor 10 in opposition at an impressed speed. When the impressed mechanical speed equals the characteristic electrical speed, the other rotor, which becomes the mechanical output shaft, does not rotate and no error signal is produced. If, however, either the impressed speed or the characteristic speed changes, the mechanical output shaft will rotate, producing an error signal, indicating that the characteristic speed of the motor does not equal the impressed mechanical speed. The error signal may be used to effect a correction in either the mechanical input or the electrical input, so as to return the differential to a balanced state.

The actual error signal means may be, among other things, a set of contacts actuated by the output shaft or a rheostat driven by the output shaft. In such cases, it may be desirable to have the rotation of the mechanical output shaft restricted, so that this shaft would not rotate beyond the limits imposed by the contacts or the rheostat.

Figure 3:
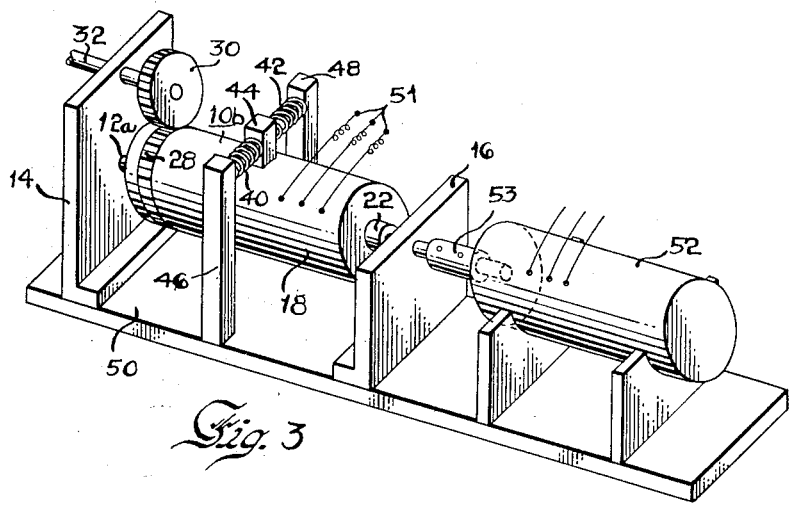
Figure 3 is a perspective view of a rotatably mounted electric motor coupled to a stationary electric motor to form an electrical differential.

In Figure 3, a modification of the rotatably mounted motor of Figure 1 is presented, wherein the mechanical output shaft is restrained from rotating beyond specified limits by a pair of springs. In this modification, the mechanical input is delivered to the shaft 12a of the first rotor 12 of a rotatably mounted motor 10b and the mechanical output is taken from the second rotor 18 by means of gears 28 and 30 which drive the output shaft 32. Rotation of the second rotor 18 is restrained by a pair of springs 40 and 42 acting upon a stud 44 integral with the second rotor 18. The springs are supported by posts 46 and 48 mounted upon a base member 50.

Since the second rotor 18 is restricted in its rotation to a part of one revolution, rotation of the output shaft 32 will be confined within corresponding limits. With the second rotor 18 restrained, it is no longer necessary to provide slip ring contacts for energizing the motor 10b. Flexible lead wires 51 are sufficient for this purpose.

Figure 3 also illustrates a special case, wherein the rotatably mounted motor 10b functioning as an electromechanical differential, is coupled through a coupling member 53 to a stationary electric motor 52, functioning as the mechanical input. The combination of the two electric motors is, in fact, an electrical differential having two electrical inputs and one mechanical output. When the two electric motors have identical operating characteristics, the electrical inputs are fully interchangeable.

The electrical differential illustrated in Figure 3 has utility as an error detection device in control circuits wherein one electrical reference signal is used to control a second electrical signal. Such a circuit is shown schematically in Figure 4.

In this control circuit, an airplane engine 54 drives a propeller 56. The engine 54 also drives a generator 58 through a variable ratio device 60 which may be used to vary the speed of the generator 58 with respect to the engine 54. The generator 58 provides an alternating current which is used to operate various auxiliary controls and accessories in the airplane.

The purpose of this control circuit is to maintain the alternating current frequency provided by the generator 58 at a constant value. To maintain the frequency constant, it is necessary to maintain the mechanical speed of the generator 58 constant, irrespective of the speed of the engine 54.

To accomplish this purpose, the control circuit utilizes two synchronous motors 10b and 52, having identical operating characteristics, coupled together to form an electrical differential of the type illustrated in Figure 3.

One of the electrical inputs to the electrical differential is obtained from a constant frequency signal generator 62. For purposes of illustration, the generator 58 is connected to the rotatably mounted motor 10b and the constant frequency generator 62 is connected to the stationary motor 52. The motor 52 thus becomes a reference motor and the motor 10b is a control motor.

If the frequency delivered by the generator 58 equals the reference frequency delivered by the constant frequency generator 62, and if the motors 10b and 52 operate in opposition, the electrical differential will have no output and the output shaft 32 will not rotate. However, if the frequencies are not equal, the output shaft 32 will rotate to drive the contact arm 63 of a rheostat 64.

The rheostat 64 is a circuit element of a ratio controller 66 which controls the setting of the variable ratio device 60 and thus controls the mechanical speed of the generator 58. Any movement of the contact arm 63 is detected by the ratio controller 66, which adjusts the variable ratio device so as to change the speed of the generator 58 relative to that of the engine 54.

For example, assume that the pilot of an airplane throttles down the engine 54. The speed of the generator 58 will decrease and, as a result, the generated frequency will fall off. This will cause a decrease in the speed of the motor 10b which, in turn, will cause the output shaft 32 to drive the contact arm 63 of the rheostat 64. The movement of the contact arm 63 is detected by the ratio controller 66 which adjusts the variable ratio device 60 in such a manner that the mechanical speed of the generator 58 is increased relative to that of the engine 54. The error signal from the electrical differential will persist and the corrective forces will persist until the generator frequency once again equals the reference frequency.

Figure 4:
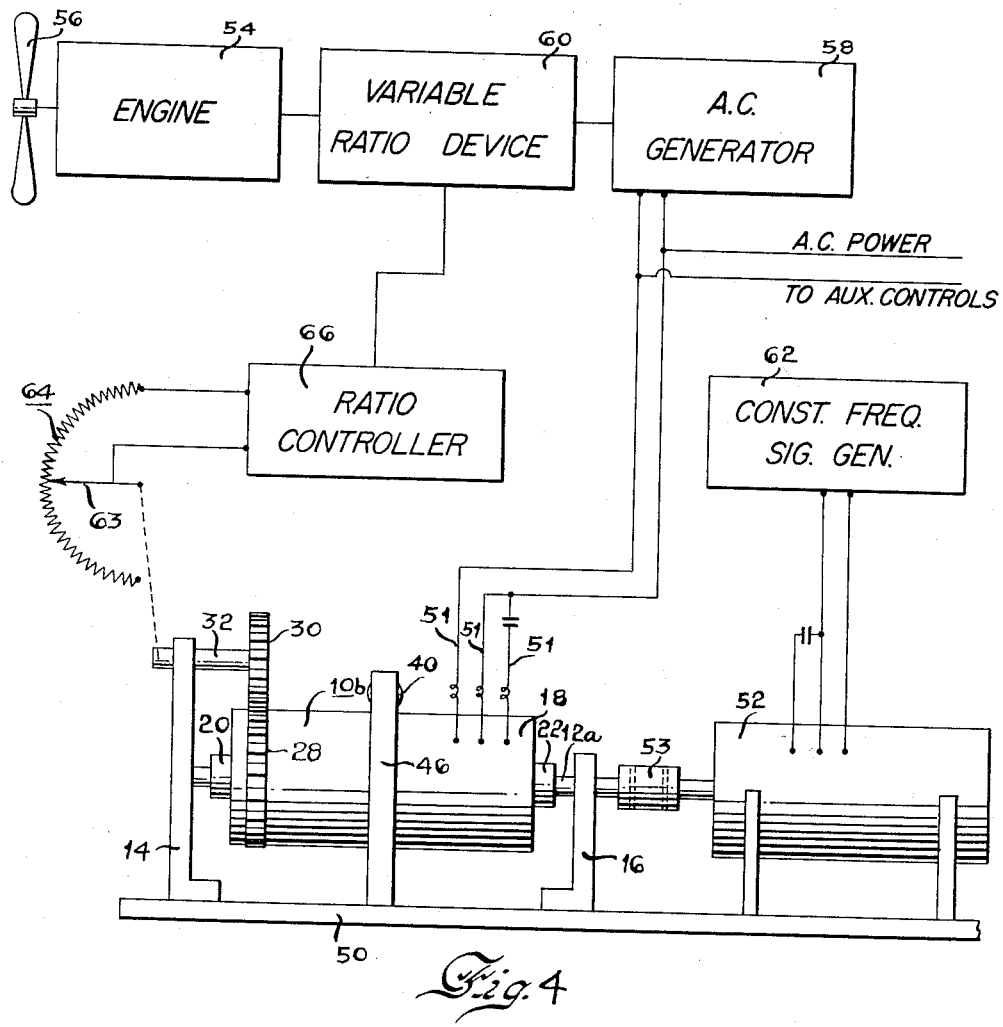
Figure 4 is a schematic view of a frequency control system embodying the electrical differential of Figure 3, the system being used to control alternating current frequency in an airplane.

The control circuit of Figure 4 could be made to work with equal effectiveness if the synchronous reference motor 52 were replaced by a D.-C. motor operating at a constant speed regulated by a governor and if the constant frequency signal generator 62 were replaced by a rectifier receiving electrical energy from the generator 58. Thus, it is not essential in this application that the two motors of the electrical differential have identical operating characteristics.

Although the preferred embodiment and various modifications of this device have been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. In a controlled frequency generating system including an alternating current generator, means for driving said generator mechanically, and means for regulating the mechanical speed of said generator, the improvement comprising a rotatably mounted synchronous motor energized by said generator whereby said motor operates at a speed proportional to the output frequency of said generator, said motor having independently rotatable housing and armature members, means for rotating one of said members mechanically at a constant speed in opposition to the induced electrical rotation of the motor, means for restricting the rotation of the other of said members within predetermined limits, resilient means biasing said other member to an intermediate position between said predetermined limits, and means responsive to displacement of said other member from the intermediate position thereof for operating said speed regulating means so as to effect a corrective change in the speed of said generator.

2. The improvement according to claim 1 wherein the means for rotating one of the members of said motor at a constant mechanical speed includes a second synchronous motor and a constant frequency signal generator for energizing said second synchronous motor.

3. A controlled frequency generating system comprising, in combination: an alternating current generator, mechanical drive means for said generator, a variable speed device interposed between said generator and said mechanical drive means, a speed controller adapted to adjust the variable speed device and thus mechanically vary the speed of the generator, a rotatably mounted synchronous motor having independently rotatable housing and armature members, one of said members being energized by said generator to operate said motor at a speed proportional to the output frequency of said generator means, means for rotating the other of said members at a constant speed in opposition to the induced electrical rotation of the motor, said motor thereby having an output rotation equal to the difference in speed between the constant speed and that speed which is proportional to the output frequency of said generator, said motor output being coupled to a means for adjusting said speed controller, whereby the generator drive speed is adjusted in accordance with generator frequency variations to obtain a corrective change in speed of said generator.

References Cited in the file of this patent

UNITED STATES PATENTS

| | | |
|---|---|---|
| 1,376,432 | Hellmund | May 3, 1921 |
| 1,527,637 | Fick | Feb. 24, 1925 |
| 1,828,943 | Rossman | Oct. 27, 1931 |
| 2,296,177 | Newton | Sept. 15, 1942 |
| 2,309,904 | Hunsdorf | Feb. 2, 1943 |
| 2,390,812 | Snyder | Dec. 11, 1945 |
| 2,532,290 | Cochran | Dec. 5, 1950 |
| 2,627,596 | Andrews | Feb. 3, 1953 |

FOREIGN PATENTS

| | | |
|---|---|---|
| 952,340 | France | May 2, 1949 |